United States Patent [19]

Takahashi et al.

[11] Patent Number: 5,097,352
[45] Date of Patent: Mar. 17, 1992

[54] OPTICAL SYSTEM INCLUDING LIQUID CRYSTAL DEVICES

[75] Inventors: Susumu Takahashi, Kunitachi; Yoshinao Oaki, Hachiouji; Akira Takano, Hachiouji; Hirofumi Miyanaga, Hachiouji; Hisanari Shimazu, Akishima; Kimihiko Nishioka, Hachiouji; Akitoshi Toda, Kinitachi; Yoshisada Aoki, Hachiouji, all of Japan

[73] Assignee: Olympus Optical Co., Ltd., Tokyo, Japan

[21] Appl. No.: 413,245

[22] Filed: Sep. 27, 1989

[30] Foreign Application Priority Data

Sep. 28, 1988 [JP] Japan .................. 63-242800
Oct. 17, 1988 [JP] Japan .................. 63-261039
Oct. 26, 1988 [JP] Japan .................. 63-270139

[51] Int. Cl.⁵ .................. G02F 1/1335; G02F 1/133; G02F 1/137; G02B 26/08
[52] U.S. Cl. .................. 359/41; 359/63; 359/86; 359/93; 359/209
[58] Field of Search .............. 350/347 R, 347 V, 352, 350/331 T, 335, 347 E, 331 R, 337; 128/6; 358/98

[56] References Cited

U.S. PATENT DOCUMENTS

| | | | |
|---|---|---|---|
| 4,037,929 | 7/1977 | Bricot et al. | 350/336 |
| 4,190,330 | 2/1980 | Berreman | 350/331 |
| 4,721,363 | 1/1988 | Inoue | 350/331 T |
| 4,762,399 | 8/1988 | Wu | 350/347 V |
| 4,768,864 | 9/1988 | Wu et al. | 350/351 |
| 4,904,063 | 2/1990 | Okada et al. | 350/331 R |
| 4,927,240 | 5/1990 | Stolov et al. | 350/337 |
| 4,928,172 | 5/1990 | Uehara et al. | 358/98 |

FOREIGN PATENT DOCUMENTS

53-33095 3/1978 Japan .................. 340/784

Primary Examiner—Rolf Hille
Assistant Examiner—Robert P. Limanek
Attorney, Agent, or Firm—Cushman, Darby & Cushman

[57] ABSTRACT

An objective optical system is provided with at least one liquid crystal lens whose polarizing characteristic selected in a direction such that polarizing components of light reflected from the lens are counterbalanced and a variable liquid crystal stop is arranged at an angle with respect to an optical axis so that an incident direction of light is deviated to the side on which contrast between transmission and blocked states of light is maximized. The objective optical system enables the balance of the polarizing components to bring about a proper image for observation, can moderate asymmetry, relative to the optical axis, of the contract between the transmission and blocked states of light of the liquid crystal stop, and can secure an adjustable object image.

12 Claims, 12 Drawing Sheets

OPTICAL SYSTEM INCLUDING LIQUID CRYSTAL DEVICES

BACKGROUND OF THE INVENTION

A) FIELD OF THE INVENTION

The present invention relates to an optical system including a liquid crystal lens and/or a liquid crystal stop device which is suitable for endoscopes.

B) DESCRIPTION OF THE PRIOR ART

An optical system for endoscopes is constructed so that light is irradiated toward an object and an image of the object is formed by the light reflected from the object, and it has recently been proposed that liquid crystal elements such as liquid crystal lenses and liquid crystal stops should be used in the optical system to eliminate mechanical driving sections for focusing and exposure control.

Figure 1:
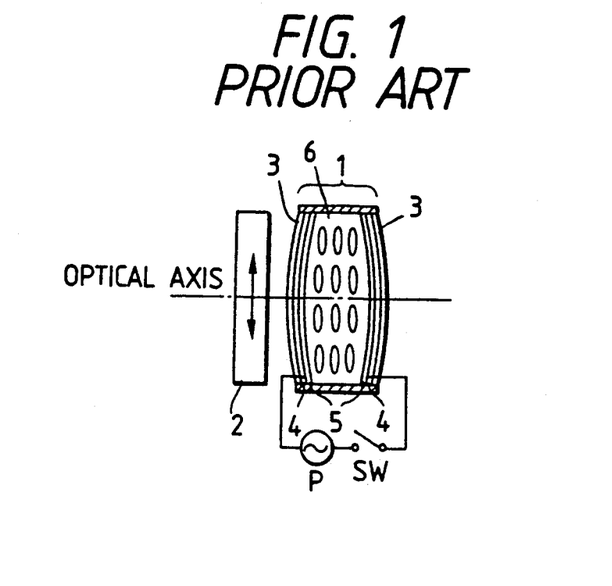
FIG. 1 is a schematic sectional view of a conventional example of a liquid crystal lens.

By way of example, a liquid crystal lens, as shown in FIG. 1, comprises a liquid crystal cell 1 and a polarizing plate 2 arranged in front thereof (i.e., on an object side), in which the liquid crystal cell 1 is constructed in such a way that a transparent electrode 4 and an orientation film 5 are provided on each of surfaces, directed to each other, of transparent plates 3, made from materials such as glass or acrylic resin, at least one of which is curved, and a nematic liquid crystal 6 is enclosed in a positive lens-shaped cell configured by the surfaces directed to each other. In the case where a switch SW is turned off and a voltage is not applied across the transparent electrodes 4, molecules of the liquid crystal 6 assume the homogeneous alignment that a direction of a longitudinal axis of each molecule arrayed by the orientation film coincides with a vibrating direction of the polarizing plate 2. Accordingly, the liquid crystal 6 will reach a high state of its refractive index with respect to incident light transmitted by the polarizing plate 2, thus reducing the focal length of the liquid crystal lens. Further, where the switch SW is set to ON and the voltage more than a constant value is applied between the transparent electrodes 4, the molecules of the liquid crystal 6 assume the homeotropic alignment, namely, the alignment that the direction of the longitudinal axis of each molecule is normal to the vibrating direction in a plane of vibration of the polarizing plate 2, with the result that the refractive index of the liquid crystal 6 relating to the incident light diminishes and the focal length of the liquid crystal lens increases.

Figure 2:
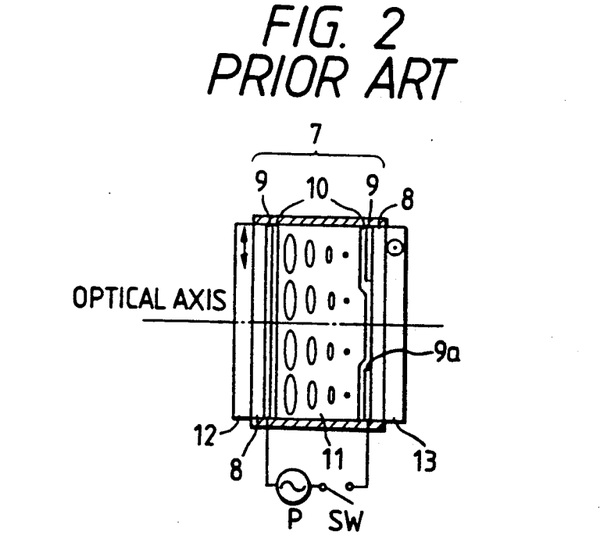
FIG. 2 is a schematic sectional view of a conventional example of a liquid crystal stop.

Also, as an example of the liquid crystal stops, the structure of the liquid crystal lens making use of a twisted nematic (TN) liquid crystal cell is shown in FIG. 2. A TN liquid crystal cell 7 comprises a nematic liquid crystal 11 enclosed in a cell configured so that two faces, on which transparent electrodes 9, and orientation films 10, are laminated to transparent substrates 8, are directed to each other in such a manner that an orientation direction is twisted at an angle of 90°, in which one of the transparent electrodes 9, as shown, is configured into an annular shape devoid of its middle portion to assume a variable stop. The liquid crystal cell 7 is then sandwiched between two polarizing plates 12, 13 whose polarizing directions are normal to each other so that the liquid crystal stop is constructed. Since the molecules of the liquid crystal exhibit the twist alignment in an off condition of the switch SW, linearly polarized light incident on the TN liquid crystal cell 7 through the polarizing plate 12 traverses and emanates from the polarizing plate 13 after its plane of polarization is rotated at an angle of 90° by the liquid crystal cell 7. However, when the switch is set to ON and a voltage more than a constant value is applied between the transparent electrodes 9, the liquid crystal molecules are arrayed along an electric field to turn to the homeotropic alignment and lose the function of rotating the plane of polarization, with the result that the light traversing the TN liquid crystal cell 7 cannot pass through the polarizing plate 13. Since such an effect is not brought about in a place devoid of the transparent electrode 9, it follows that, in the middle portion of the liquid crystal stop, the light always passes irrespective of the on-off operation of the switch SW, while in the annular portion of its outside, the changeover of block-transmission of light is performed in response to the on-off operation of the switch SW.

Figure 3:
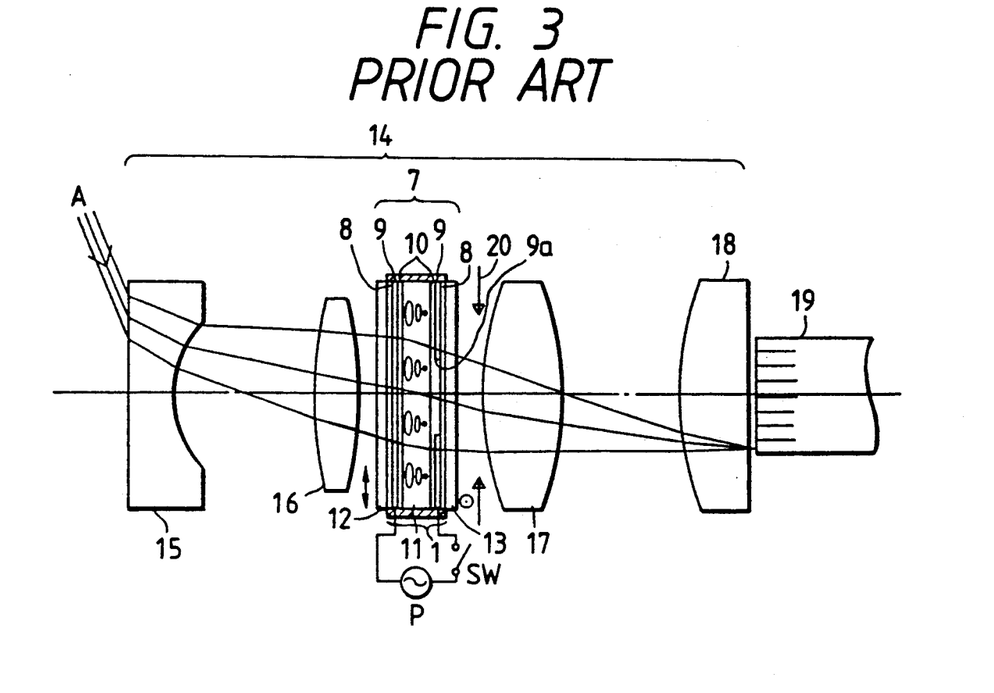
FIG. 3 is a view showing a configurational example of an objective lens unit including a conventional liquid crystal stop.

In FIG. 3, the structure is depicted in which the liquid crystal stop is provided in such a manner that the center of a middle circle 9a of the transparent electrode 9 coincides with an optical axis of the optical system for endoscopes. This drawing depicts the optical system of a tip portion of a fiber scope, in which an arrangement is such that an objective lens unit 14 comprises a retrofocus-type lens system provided with a negative lens 15 on an object side and a positive lens group including positive lenses 16, 17, 18 provided on its exit side and an entrance end face of an image guide fiber bundle 19 is disposed in close vicinity to an exit surface of the positive lens 18. The liquid crystal stop is provided in such a position that imaging beams of light are nearly parallel to each other between the positive lenses 16 and 17. A stop 20 placed directly behind the liquid crystal stop consists of a light blocking plate provided with a circular aperture by which the maximum aperture of the objective lens unit will be defined. The positive lens 18 acts as a field lens for making a principal ray incident almost vertically on the entrance end face of the image guide 19. Thus, when the switch SW is set to OFF, the F-number of the objective lens unit 14 will be determined by the aperture stop 20, while on the other hand, when the switch SW is ON, it will be determined by the middle circle 9a of the transparent electrode 9 of the liquid crystal cell 7, and as such the optical system for endoscopes variable in F number can be obtained.

Figure 4:
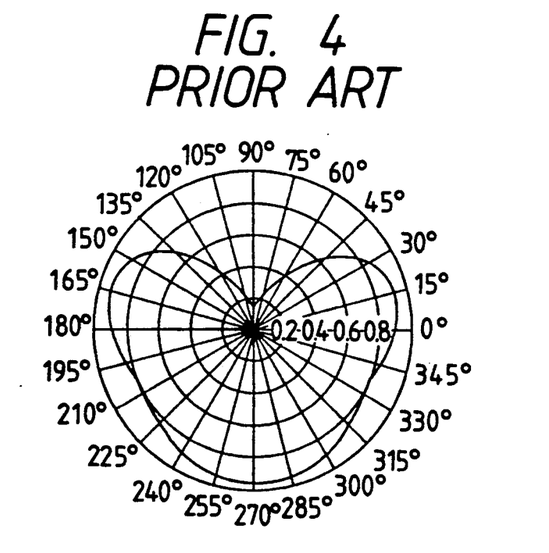
FIGS. 4 and 5 are views for explaining asymmetry, relating to an optical axis, of the contrast between the transmission and the block of light of the liquid crystal stop.
Figure 5:
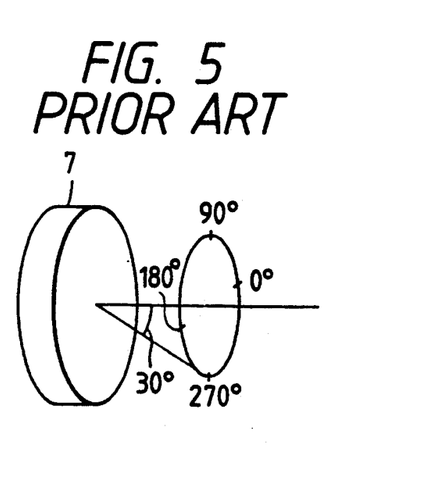

Also, since the liquid crystal stop is usually arranged perpendicular to the optical axis, as shown in FIG. 3, the problem arises that the contrast between transmission and blockage of light changes in accordance with an angle of incidence of light, due to angle dependency of an electrooptic effect of the liquid crystal. FIG. 4 shows that when the thickness of the liquid crystal cell 7 of the liquid crystal stop is 10 μm, the frequency of a power source P is 100 $H_z$, and the temperature of the liquid crystal cell 7 is 30° C., the contrast between transmission and block of light of the liquid crystal stop, viewed from a direction making an angle of 30° with the optical axis as shown in FIG. 5, changes over the entire circumference. Also, in the liquid crystal cell of FIG. 5, it is assumed that the aperture 9a of the transparent electrode such as is shown in FIG. 3 is not provided. In FIG. 4, the circumference represents angles from a reference position, the radii indicate contrast, and the contrast becomes progressively high in separating from the center of the circle. As will be apparent from this diagram, the contrast is not symmetrical with respect& to the optical axis, lowest when viewed from the upper side at an angle (90°), highest when viewed from the lower side at an angle (279°), and moderate at other angles. Accordingly, in the example of FIG. 3, the problem is encountered that the effect of the stop varies in response to the position of a visual field in such a manner that since a beam of light A exhibits low contrast as compared with a light beam being oblique at the same angle on the opposite side thereof, even when the switch SW is set to ON, part of the light beam A will pass through the annular portion, while the light beam inclined on the opposite side is completely blocked.

In general, a polarized light component (P component) vibrating in a plane parallel with a reflecting surface and a polarized light component (S component) having a vibrating direction normal to the P component are different in reflectance from each other. As a result, in the case where the liquid crystal device such as is stated above is used in the optical system for endoscopes, an improper selection of the polarizing direction of the polarizing plate has caused the problems that specular reflection light prevents observation as a bright spot and an observation image with average intensity of the P component and the S component is not attained.

Moreover, the liquid crystal device such as stated above has the properties that the speed of change of the state by the on-off operation of the switch SW varies in response to the temperature condition of the liquid crystal per se. Specifically, the speed of change decreases at low temperatures, while it increases at high temperatures. Where the liquid crystal device of this type is utilized in the optical system for endoscopes, the temperature of the liquid crystal is principally affected by an ambient temperature in the distal end portion of the endoscope and the heat generated by the illuminating light.

SUMMARY OF THE INVENTION

An object of the present invention is to provide an optical system equipped with an objective lens unit including a liquid crystal lens constructed so that an image with a proper balance of polarized light components is attained for observation.

Another object of the present invention is to provide an optical system capable of moderating asymmetry, relating to an optical axis, of the contrast between transmission and block of light of a liquid crystal stop.

Still another object of the present invention is to provide an optical system constructed so that an image of an object always properly adjusted can be obtained by variably controlling the temperatures of the liquid crystal lens and the liquid crystal stop.

The optical system according to the present invention is equipped with the objective lens unit including a liquid crystal device and receiving light reflected from the object to from the image, in which a polarizing characteristic of the liquid crystal device is selected in such directions that the polarized light components of the light reflected from the object are counterbalanced each other.

According to the present invention, the objective lens unit comprises a variable stop including the liquid crystal device, in which the liquid crystal device is arranged at an angle with respect to the optical axis in such a way that an incident direction of light deviates to the side on which the contrast between the transmission and the block of light of the liquid crystal is maximized. A liquid crystal cell of the liquid crystal device may be curved or bent to be symmetrical in regard to the optical axis so that incident angles of all principal rays of the liquid crystal device become substantially the same, together with their incident directions. The liquid crystal cell curved as in the foregoing makes it possible for any principal ray to be vertically incident on the liquid crystal device. Furthermore, the liquid crystal cell may be equally divided around the optical axis into plural sections so that directions of arrays of liquid crystal molecules in respective liquid crystal cell sections assume rotational symmetry with respect to the optical axis. If the array directions of the liquid crystal molecules are completely radial, the symmetry will be most favorable. Thus, an object image with brightness devoid of unevenness is obtained.

Further, according to the present invention, a temperature adjusting means is attached to the liquid crystal device so that the temperature of the liquid crystal device can be variably controlled. Thus, the temperature of the liquid crystal device per se can adequately be held, independently of the ambient temperature, and as a consequence, the object image always properly adjusted can be secured.

These and other objects as well as the features and the advantages of the present invention will become apparent from the following detailed description with the preferred embodiments when taken in conjunction with the accompanying drawings.

DESCRIPTION OF THE PREFERRED EMBODIMENTS

Figure 6:
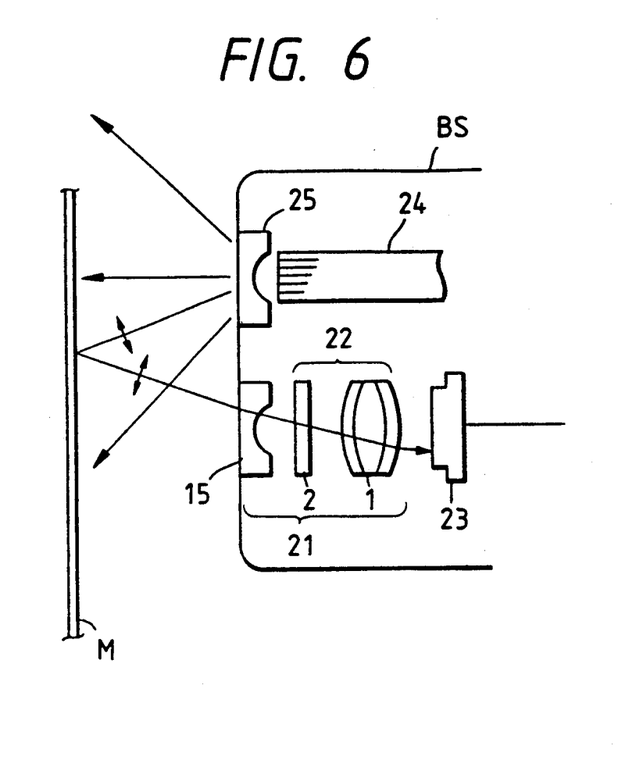
FIG. 6 is a schematic sectional view of a first embodiment applying an image pickup optical system including a liquid crystal lens according to the present invention to an endoscope.
Figure 7A:
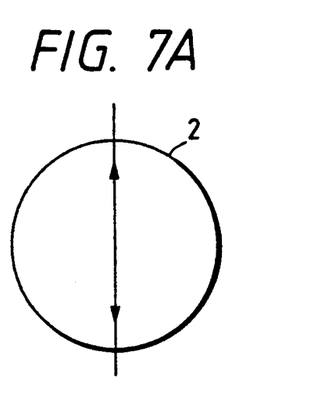
FIGS. 7A and 7B are views showing polarizing directions of a polarizing plate in the first embodiment.
Figure 7B:
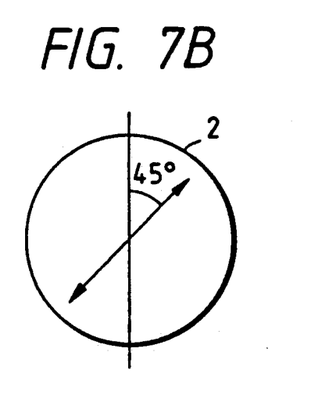

Referring first to FIGS. 6, 7A and 7B, a first embodiment of the present invention in which an objective lens unit includes the liquid crystal lens such as shown in FIG. 1 will be explained below. In FIG. 6, a liquid crystal device as the liquid crystal lens is schematically shown and, since its detailed structure is the same as in FIG. 1, like reference numerals are used to substantially like members indicated in FIG. 1. In this figure, an objective lens unit 21 is constructed from a negative lens 15, also used as cover glass, disposed on an end face at a distal end portion BS of the endoscope and a liquid crystal lens 22 comprising the polarizing plate 2 and the liquid crystal cell 1 arranged in order in the rear (i.e., on an image side) of the lens 22. Reference numeral 23 represents a solid-state image pickup element arranged at an imaging position of the objective lens unit 21. Reference numeral 24 represents a light guide fiber bundle whose exit end is arranged at the distal end portion of the endoscope to conduct light from a light source not shown and 25 an illumination lens directing the light emanating from the fiber bundle toward an object M, which constitute an illumination optical system. In such an instance, a vibrating direction of the polarizing plate 2 is such as to be capable of being arbitrarily selected.

This embodiment is constructed as in the foregoing and as such where the reflection from the object M is specular reflection, the reflectance of a polarized light component (P component) in the vibrating direction parallel to the surface of the object M (i.e., normal to the plane of the drawing) may be larger than that of a polarized light component (S component) in the vibrating direction normal thereto (i.e., parallel to the plane of the drawing) so that observation of a bright spot is prevented. In such a case, if the vibrating direction of the polarizing plate 2 is made parallel to the plane of the drawing as depicted in FIG. 7A, the polarized light component parallel to the surface of the object M will be weakened in virtue of the function of the polarizing plate 2 and the polarized light component normal thereto will pass through the objective lens unit as it is, with the result that the bright spot is eliminated and an observation image with a proper balance of the polarized light components is attained. On the other hand, where the reflection from the object M is not the specular reflection and the observation image with average intensity of the P component and the S component is required, it is only necessary to be constructed so that the vibrating direction of the polarizing plate 2, as shown in FIG. 7B, makes an angle of 45° with the plane of the drawing. In a video endoscope such as is used in the embodiment, when specular light reflected from the object M is imaged on a solid-state image pickup element 23 as an intensive bright spot, noises develop extensively in a picture image and as such an optical low-pass filter is usually provided in the optical system to blur the bright spot. Since the objective optical system of the endoscope is packed with lenses, it is troublesome to provide space sufficient for the filter. The embodiment, however, is such that the bright spot is removed by the liquid crystal lens 22 per se including the polarizing plate 2 as mentioned above, and therefore can favorably omit the optical low-pass filter.

Figure 8:
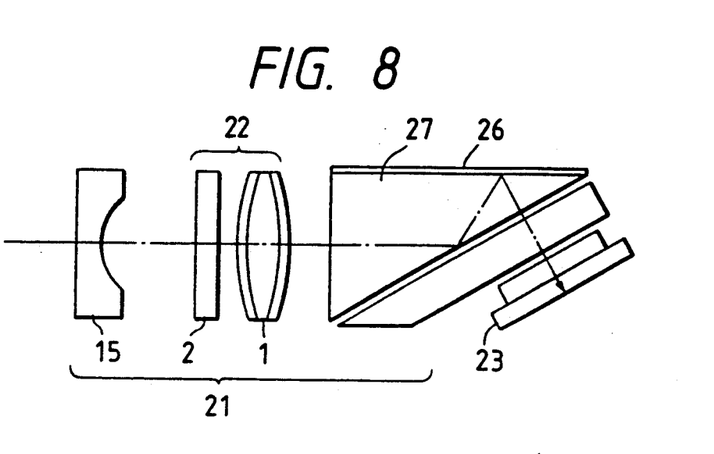
FIG. 8 is a schematic sectional view of a second embodiment of the present invention.
Figure 9A:
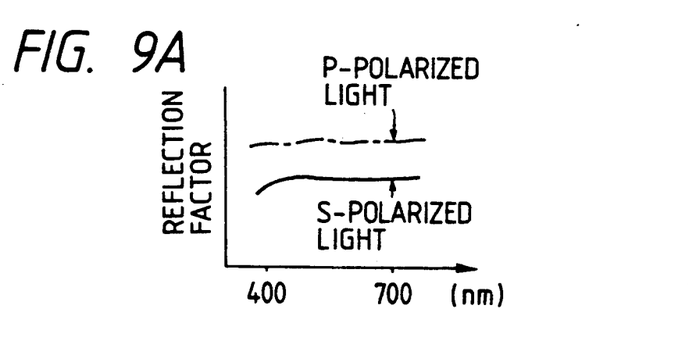
FIGS. 9A and 9B are views showing the difference between polarized light components in reflectances of light reflecting surfaces in the second embodiment.
Figure 9B:
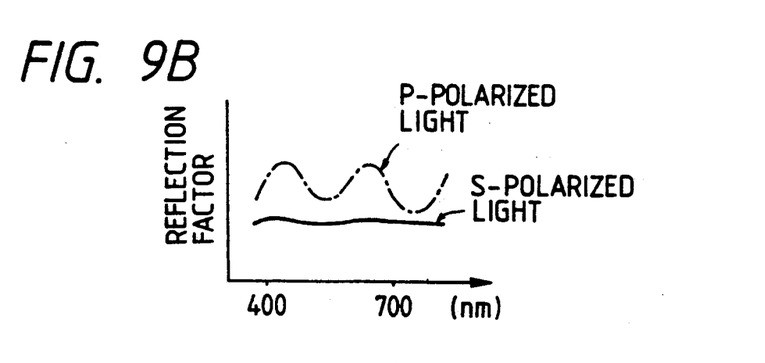

FIG. 8 shows a second embodiment, which is the case where a prism 27 with a reflecting surface 26 such as Al, Ag, etc. is included in the objective lens unit 21. In the second embodiment, with respect to the reflecting surface 26, the polarized light component (P component) in the vibrating direction parallel to the reflecting surface 26, as shown in FIG. 9A, is different in reflectance from the polarized light component (S component) in the vibrating direction normal thereto. On the other hand, light which has been transmitted by the liquid crystal lens 22 turns to linearly polarized light. If a polarizing characteristic of the liquid crystal lens 22 is thus set so that the vibration of the linearly polarized light follows a direction of high reflectance of the reflecting surface 26, reflection loss of the optical system will diminish. Since the optical system provided with a liquid crystal element in particular loses nearly half of the amount of incident light through the polarizing plate, the above setting is effective in comparison with an ordinary optical system. Further, in the reflecting surface 26, the P component and the S component, as shown in FIG. 9B, may be different from each other in wave dependency of spectral reflectance and where a component whose wave dependency of the spectral reflectance is high (namely, a reflectance curve assumes a wave form) is intensive, the incident light on the solid-state image pickup element 23 may be colored. Accordingly, if the polarizing characteristic of the liquid crystal lens 22 is set so that the vibration of the linearly polarized light transmitted by the liquid crystal lens 22 follows a direction that the wave dependency of the spectral reflectance is as low as possible (namely, the reflectance curve is flat) at the reflecting surface 26, the coloring of the incident light on the solid-state image pickup element 23 is blocked with favorable results.

Figure 10:
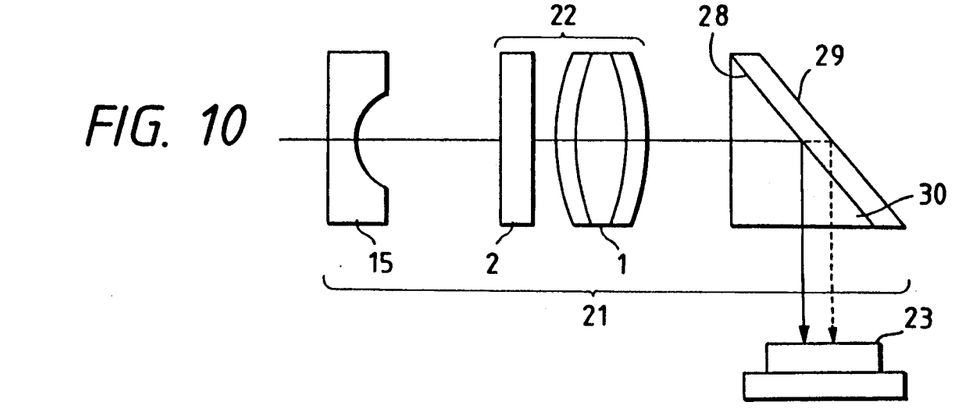
FIGS. 10 to 19 are schematic sectional views of third to twelfth embodiments, respectively, of the present invention.

FIG. 10 shows a third embodiment, which is the case where an arrangement is made so that an optical low-pass filter 30 with a function of forming a twin image on the solid-state image pickup element 23 by a semi-transmissive surface 28 and a totally reflecting surface 29 which have minute space, is disposed in the objective lens unit 21 to eliminate color moire. In the case of the third embodiment, since between the semi-transmissive surface 28 and a totally reflecting surface 29, there is a difference of reflectance attributable to the vibrating direction of the polarized light component, the difference of the amount of light arises between reflected light and transmitted light, depending on the vibrating direction of the linearly polarized light incident on those surfaces, and the intensity of the twin image lacks uniformity, which is disadvantageous. Thus, if the arrangement is made so that the vibrating direction of the linearly polarized light incident on the semi-transmissive surface 28 and the totally reflecting surface 29 makes an angle of 45° with the plane of the drawing, the same amounts of the P component and the S component will be contained in the light. As a result, the difference of the amount of light between the reflected light and the transmitted light diminishes and the intensity of the twin image becomes practically uniform, which is advantageous.

Figure 11:
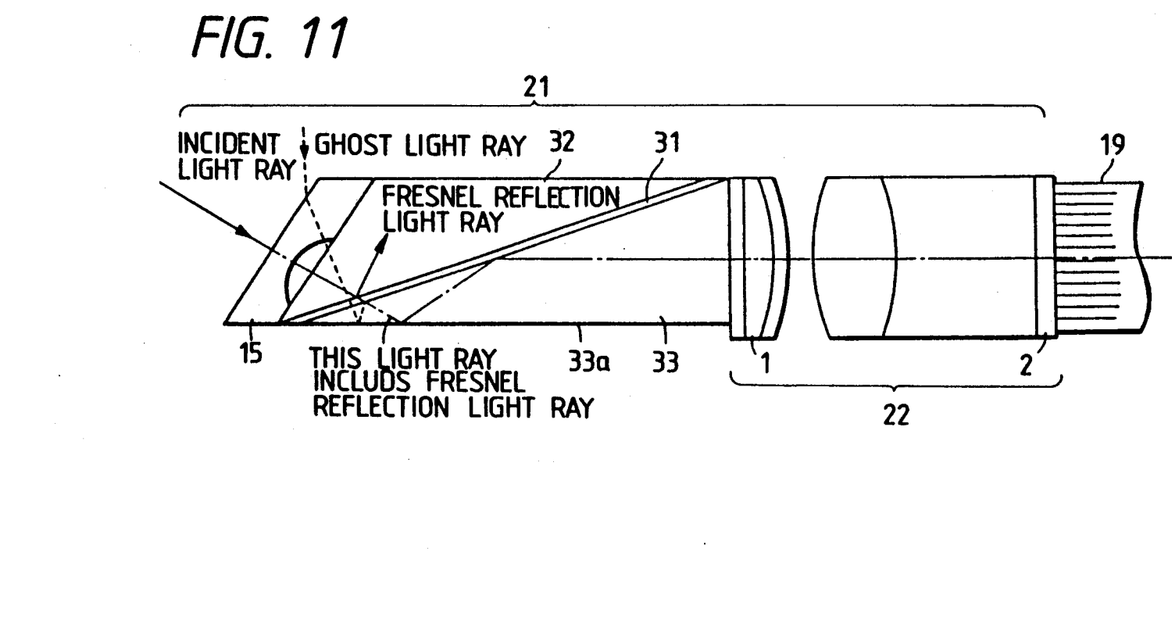

FIG. 11 depicts a fourth embodiment, which is the case where an auxiliary prism 32 and a field converting prism 33 cemented to each other by an adhesive 31 are incorporated in the objective lens unit 21 of oblique-view type arranged in front of the image guide fiber bundle 19. The fourth embodiment is designed so that the light incident on the negative lens 15 is transmitted through a cemented surface between the two prisms 32 and 33, reflected from a reflecting surface 33a of the prism 33, and after totally reflected from the cemented surface, incident on a rear optical system including the liquid crystal lens 22. This embodiment, however, has such defects that, when the light is transmitted by the cemented surface, Fresnel reflection (reflection whose reflectance curve assumes the wave form) occurs due to an interference action caused by the layer of the adhesive 31 and consequently the loss of the amount of incident light and the mixture of ghost light rays attributed to the Fresnel reflection are involved. Also, the reflectance of the Fresnel reflection has high dependency with respect to the vibrating direction of the polarized light. Thus, if the vibrating direction of the polarizing plate 2 of the liquid crystal lens 22 is selected to follow a direction that the reflected light component of high reflectance of the Fresnel reflection is removed, the reduction of the amount of light caused by the polarizing plate 2 will be held at a minimum and the ghost light ray will be able to be eliminated. Also, since the total reflection from the cemented surface is different from the Fresnel reflection in condition, the polarized light component of high reflectance of the total reflection cannot be removed even though that of high reflectance of the Fresnel reflection is removed.

Figure 12:
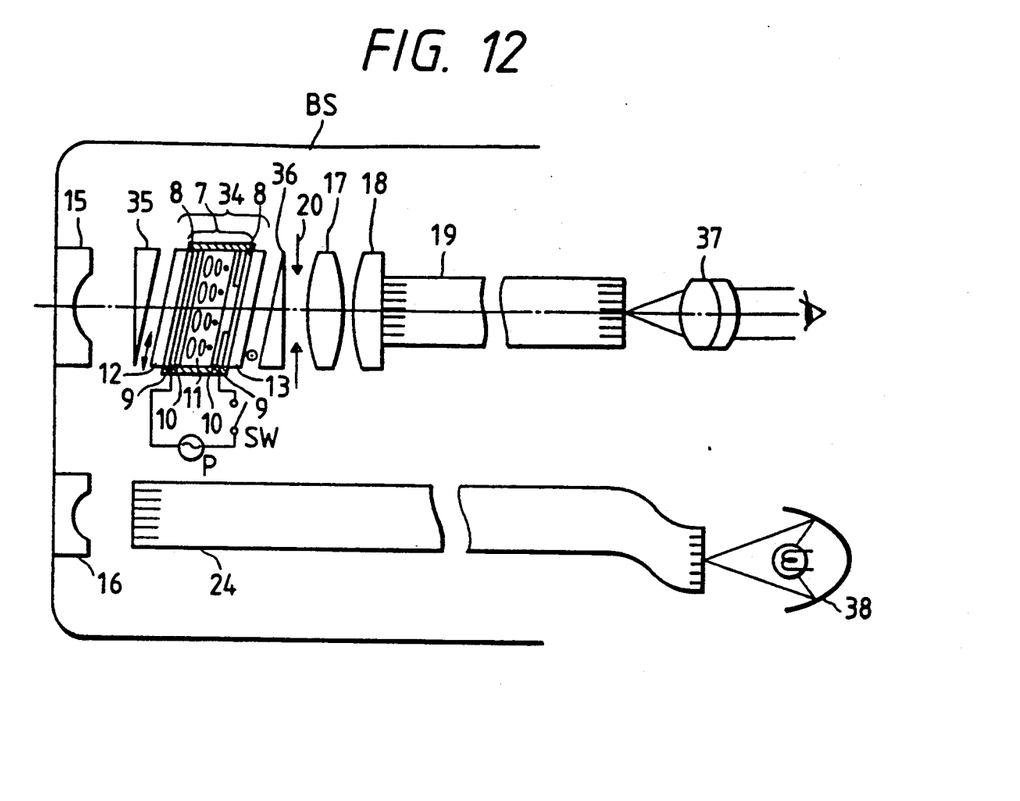

FIG. 12 shows a fifth embodiment. In this embodiment, the objective lens unit includes a liquid crystal stop 34 constructed similar to the conventional one. The liquid crystal stop 34, however, is arranged at an angle in regard to the optical axis to deviate the incident direction of light to the side on which the contrast between the transmission and the block of light is maximized. Further, in order to correct aberration generated by inclining the liquid crystal stop 34 to the optical axis, prisms 35 and 36 is disposed before and behind the liquid crystal stop 34. As a matter of course, where the aberration involves no problem, the prisms 35 and 36 may be excluded. In the rear of the exit end face of the image guide fiber bundle 19 are arranged an eyepiece 37, which constitutes an observing optical system, together with the objective lines unit. Further, in parallel with the observing optical system are arranged an illuminating optical system comprising a light source 38, a light guide fiber bundle 24 and an illuminating lens 16.

The fifth embodiment is constructed as stated above, in which the liquid crystal stop 34 is arranged at an angle in regard to the optical axis to deviate the incident direction of light to the side on which the contrast between the transmission and the block of light is maximized. For this reason, the incident angle of light entering the stop on the side of low contrast reduces in comparison with the case there the stop is provided perpendicular to the optical axis and the contrast relating to the light entering from such a direction will increase. As a result, the asymmetry of the contrast is moderated and an image with brightness devoid of unevenness is secured.

Figure 13:
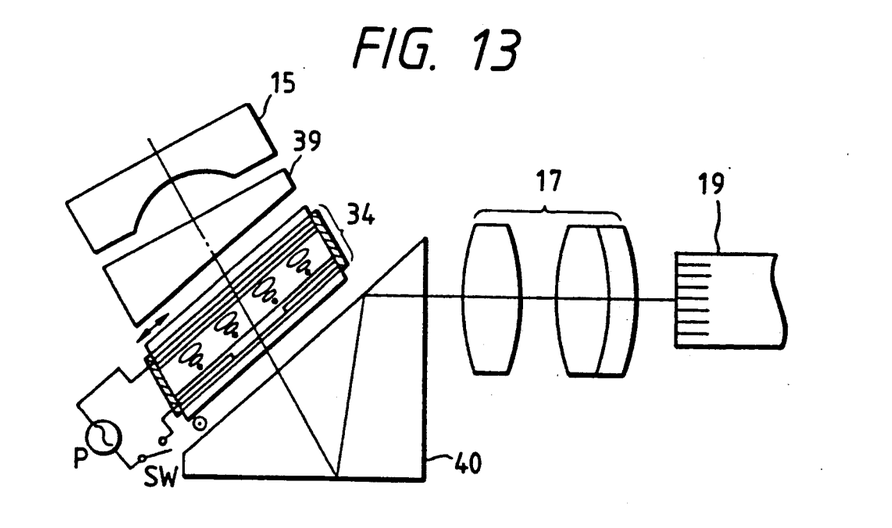

FIG. 13 shows a sixth embodiment, which is such that, in the endoscope of oblique-view type, the liquid crystal stop 34 is arranged, at an angle with respect to the optical axis, in the airspace between field converting prisms 39 and 40 and which brings about the same functional effect as the fourth embodiment.

Figure 14:
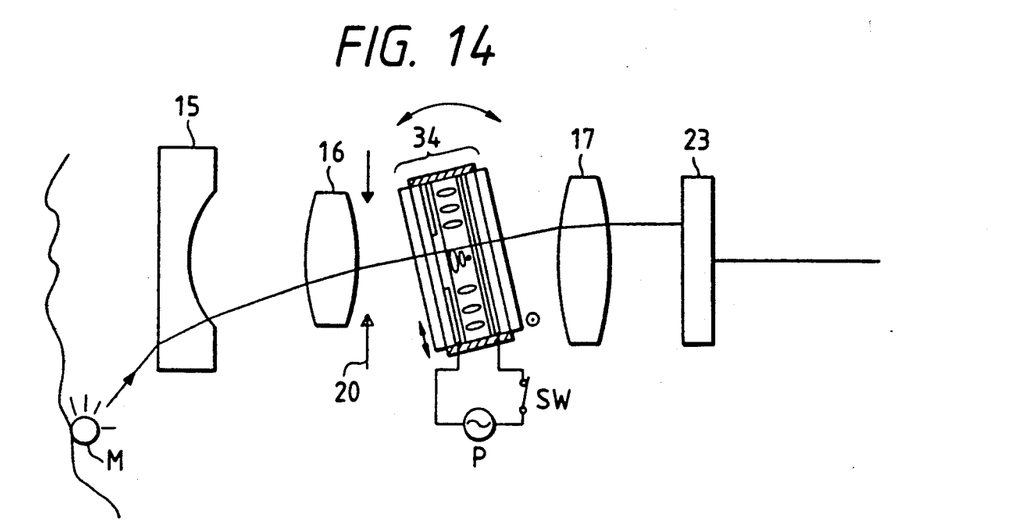

FIG. 14 depicts a seventh embodiment, which is adapted to, in an electronic endoscope provided with the solid-state image pickup element 23, arrange the liquid crystal stop 34 between the positive lenses 16 and 17 in such a manner that the inclination of the stop 34 relating to the optical axis can arbitrarily be changed. Accordingly, by changing the inclination of the liquid crystal stop 34 in response to the direction of a bright object M, when the liquid crystal stop 34 is stopped down as shown (namely, the switch SW is set to ON) so that the light coming from the bright object M enters from the side of the highest contrast of the liquid crystal stop 34, the amount of light transmitted through the liquid crystal stop 34 can be adjusted to diminish.

Figure 15:
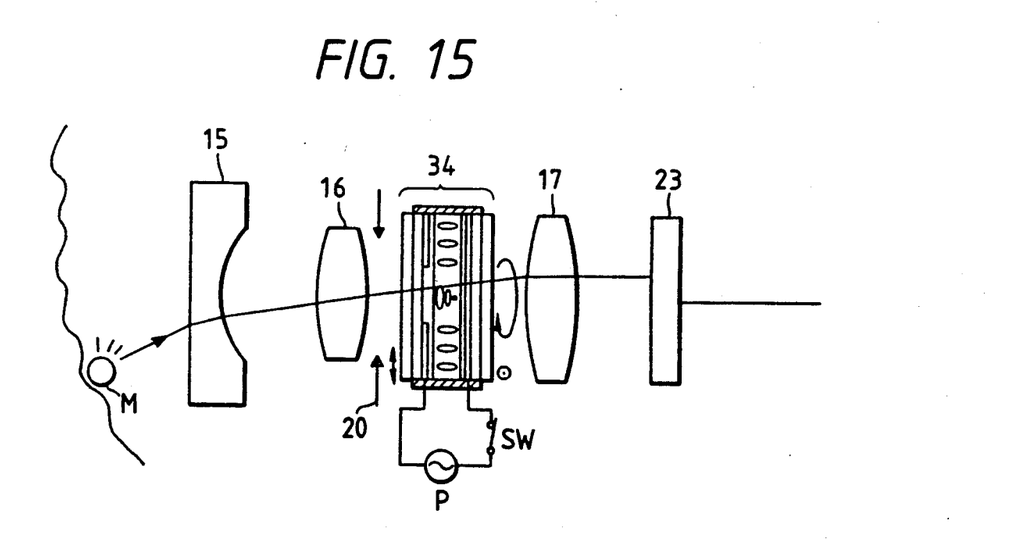

FIG. 15 shows an eighth embodiment, which is adapted to, in the electronic scope, arrange the liquid crystal stop 34 between the stop 20 and the positive lens 17 in such a manner that the stop 34 can be rotated around the optical axis. Hence, if the position of rotation of the liquid crystal stop 34 is changed in response to the direction of the bright object M so that the light from the bright object M traverses the position of the highest contrast of the liquid crystal stop 34, the same functional effect as the seventh embodiment will be brought about.

Figure 16:
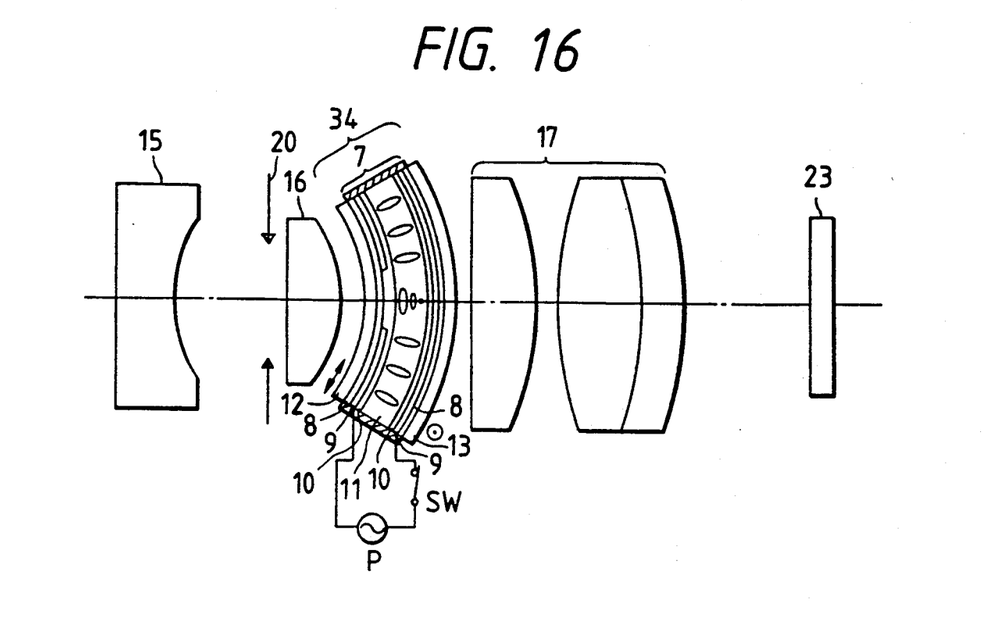

FIG. 16 shows a ninth embodiment, which is adapted to, in the electronic scope, arrange the liquid crystal stop 34 in which the liquid crystal cell 7 is bent to be symmetrical in regard to the optical axis, into a concave shape toward the object, between the positive lenses 16 and 17. With respect to principal rays incident on the liquid crystal stop 34 through the atop 20 from various directions, the incident angle on the liquid crystal stop 34 reduces and the difference between mutual incident angles of the principal rays also reduces. Accordingly, the symmetry of an incident state of the principal rays with a center at the optical axis is improved and the contrast of the liquid crystal stop 34 becomes almost uniform, independently of the directions of the principal rays, with the image devoid of unevenness in brightness. In particular, if the liquid crystal stop is curved so that the center of the stop 20 is that of curvature, the incident angles on the liquid crystal stop relating to all of the principal rays turn to zero, which is more favorable. Also, FIG. 16 indicates the state that the liquid crystal stop 34 is stopped down (that is, the switch SW is set to ON). The polarizing plates 12 and 13 may also be plane surfaces.

Figure 17:
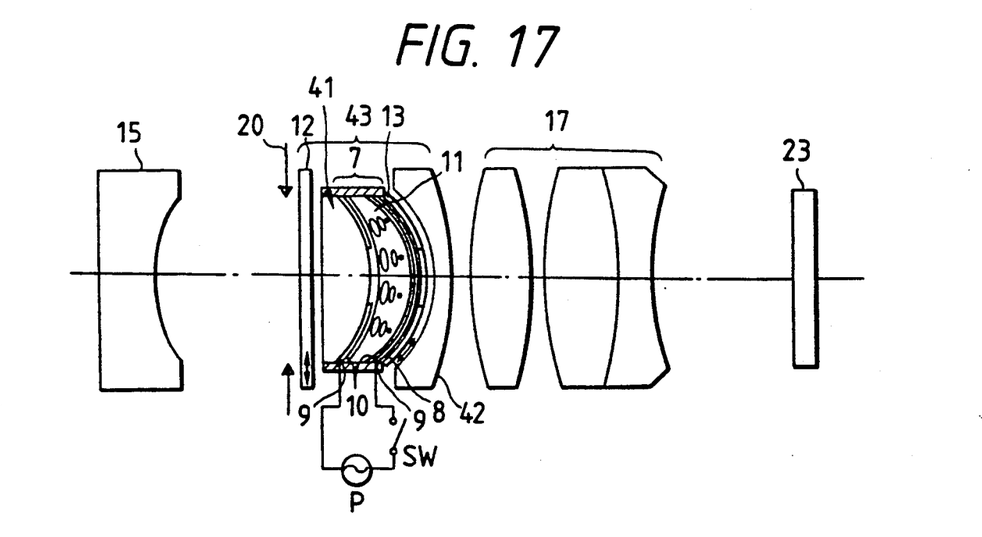

FIG. 17 shows a tenth embodiment, which is adapted to, between the stop 20 and the positive lens 17, arrange a liquid crystal lens 43, also used as the liquid crystal stop, comprising the polarizing plate 12, a positive lens 41, the liquid crystal cell 7 having a positive meniscus shape, configured integral with the positive lens 41 and bent into a concave shape toward the object to be symmetrical in regard to the optical axis, the polarizing plate 13 configured integral with the liquid crystal cell 7 so that the portion corresponding to the aperture of the center of the transparent electrode 9 on the incident side is a common transparent plate and the polarizing direction of its periphery coincides with that of the polarizing plate 12, and a positive lens 42, and which also brings about the same functional effect as the ninth embodiment. FIG. 17 indicates the state that a liquid crystal stop portion is stopped down (that is, the switch SW airspace is set to OFF).

Figure 18:
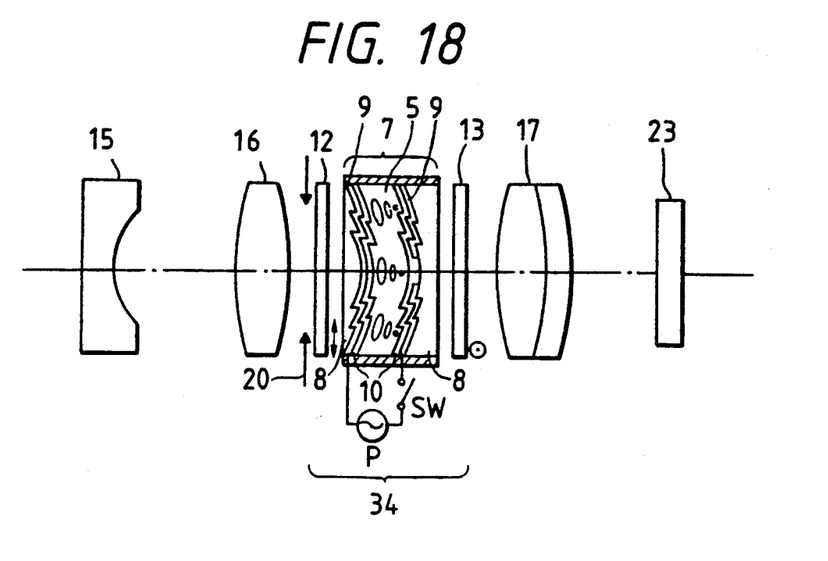

FIG. 18 shows an eleventh embodiment, which is adapted to, between the stop 20 and the positive lens 17, arrange the liquid crystal stop 34 constructed so that the trasparent electrodes 9 and the orientation films 10 of the liquid crystal cell 7 are bent toward the object to be symmetrical in regard to the optical axis, and configured into a Fresnel lens shape. Even in such construction, the same functional effect as the ninth embodiment is achieved. The liquid crystal stop 34 may be constructed to have a lens function.

Figure 19:
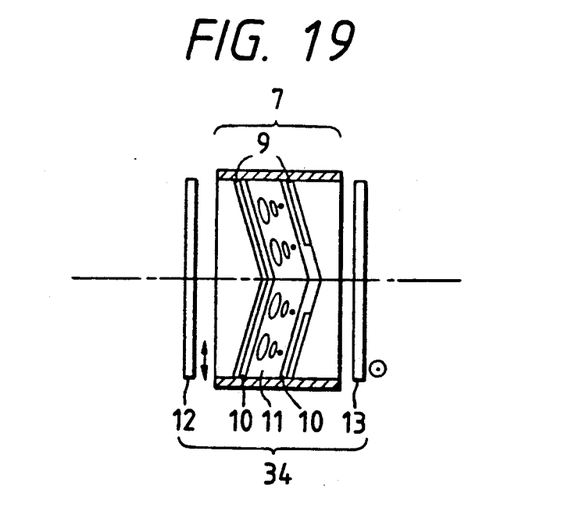

FIG. 19 shows only the liquid crystal stop portion of a twelfth embodiment, which is such that the transparent electrodes 9 and the orientation films 10 of the liquid crystal cell 7 are bent to be symmetrical in regard to the optical axis, so as to incline toward the object, that is, configured into a conical shape as a whole, and which is easy in manufacture compared with the eleventh embodiment and produces substantially the same effect as the eleventh embodiment.

Figure 20A:
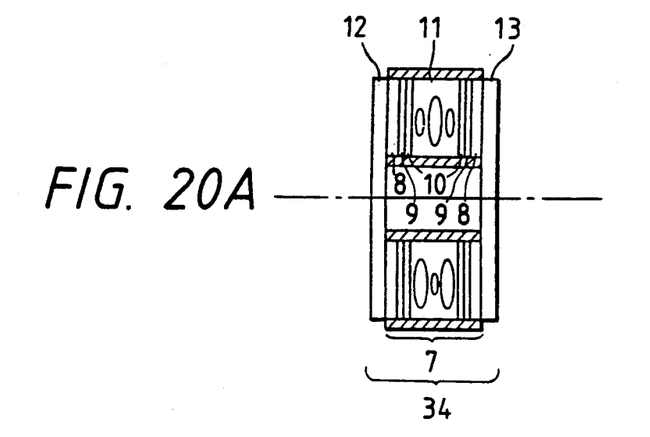
FIGS. 20A, 20B and 20C are views showing the construction of a thirteenth embodiment of the present invention.
Figure 20B:
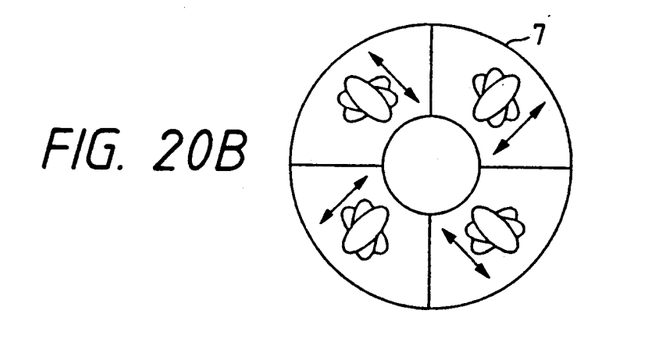
Figure 20C:
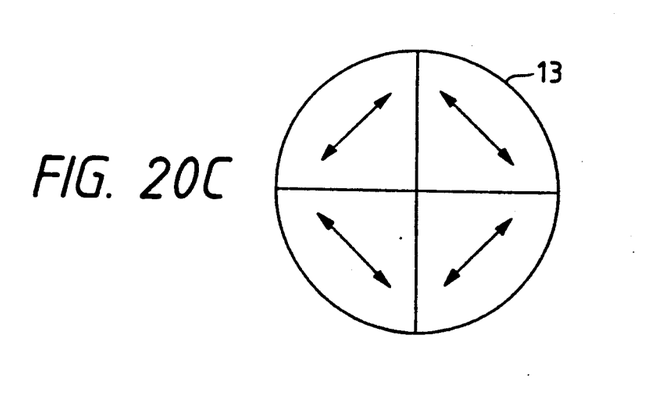

FIGS. 20A, 20B and 20C show only the liquid crystal stop portion of a thirteenth embodiment, which is such that the liquid crystal cell 7 is divided around the optical axis into four sections and the directions of arrays of liquid crystal molecules in respective sections assume rotational symmetry with respect to the optical axis, that is, vary every 90°. Here, FIG. 20A is a sectional view of the liquid crystal stop 34, FIG. 20B a front view of the liquid crystal cell 7, and FIG. 20C a front view of the polarizing plates 12, 13. In FIG. 20B, ellipses are index ellipsoids of the nematic liquid crystal and arrows indicate the polarizing directions of the polarizing plate 12. Thus, since the symmetry of the liquid crystal molecules relative to the optical axis is improved, the asymmetry of the contrast between the transmission and the block of light of the liquid crystal stop 34 is widely moderated and the image with brightness devoid of unevenness is secured. The liquid crystal cell may be divided into any number of sections and the improvement of the symmetry become greater for more sections.

Figure 21A:
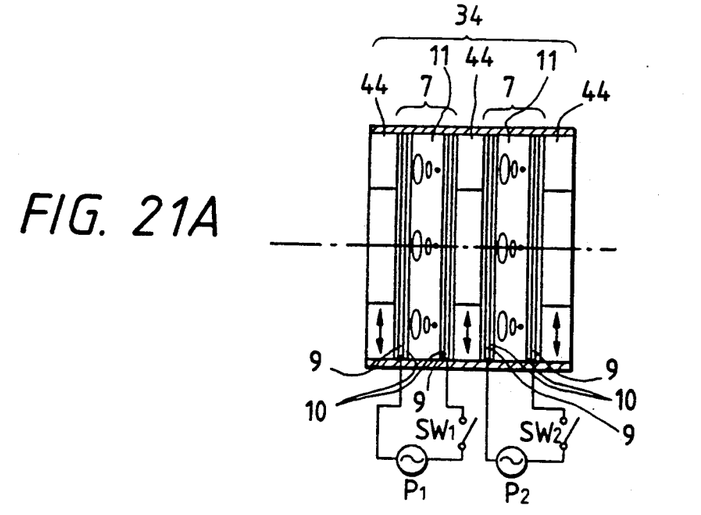
FIGS. 21A and 21B are views showing the construction and operating states of a fourteenth embodiment of the present invention.
Figure 21B:
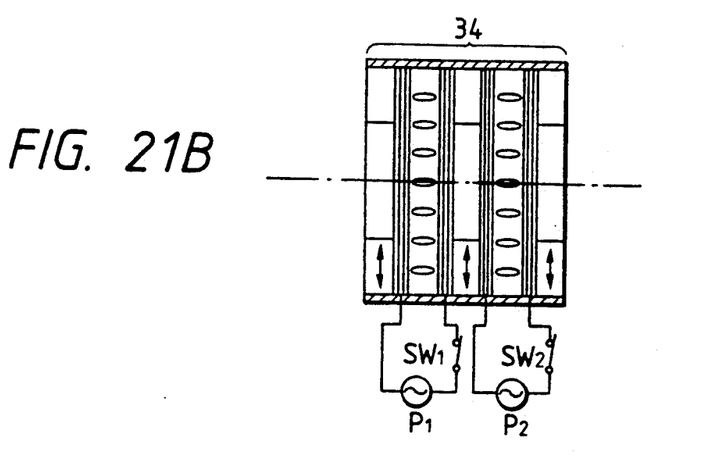

FIGS. 21A and 21B show only the liquid crystal stop portion of a fourteenth embodiment, which comprises two liquid crystal cells 7, 7 configured among three annular polarizing plates 44, so that each diameter of central apertures corresponds to a stop diameter available when each variable stop has been stopped down. Here, FIG. 21A indicates a stopped-down state of the stop (the switches SW$_1$, SW$_2$ are turned off) and FIG. 21B an opened state (the switches SW$_1$, SW$_2$ are turned on). In FIG. 21A, if the light is incident on the liquid crystal stop from the left side thereof, the polarized light (with the polarizing direction parallel to the plane of the drawing) transmitted by the first polarizing plate 44 is blocked in its transmission by the second polarizing plate 44 since the polarizing direction is rotated at an angle of 90° by the first liquid crystal cell 7, and nevertheless, incomplete arrays of the molecules of the liquid crystal 11 will cause some of the light (with the polarizing direction parallel to the plane of the drawing) to pass through the second polarizing plate 44, depending on the incident direction and the incident angle. However, such polarizing light is blocked in its transmission by the third polarizing plate 44 since the polarizing direction is rotated at angle of 90° by the second liquid crystal cell 7, and it follows from this that the leak of light is little caused as a whole. Accordingly, if such is used in the stops of, for example, objective lenses for endoscopes and lenses for television cameras, the image with brightness devoid of unevenness will be obtained. Also, in FIG. 21B, the first and second liquid crystal cells 7 have no functions of rotating the polarizing directions, so that the light is all transmitted. It is needless to say that the liquid crystal stop 34 such as the foregoing may be constructed using annular transparent electrodes instead of the annular polarizing plates.

Various embodiments of optical systems including the liquid crystal lenses and the liquid crystal stops according to the present invention have been explained and next, embodiments in which temperature adjusting means are attached to the liquid crystal lenses and the liquid crystal stops will be explained below.

Figure 22:
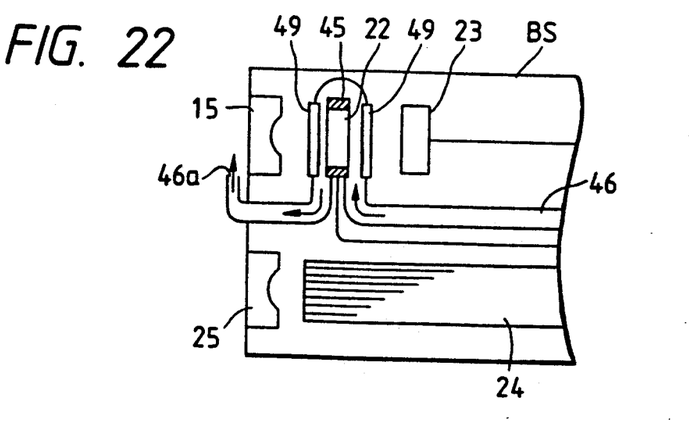
FIGS. 22 to 24 are schematic structural views of fifteenth to seventeenth embodiments, respectively, of the present invention.

FIG. 22 shows a fifteenth embodiment of the present invention. In this figure, like reference numerals are used to like members indicated in the first embodiment (FIG. 6) and, although the liquid crystal lens 22 is schematically shown for the reason of the explanation, its concrete structure is the same as those described in the above embodiments. Reference numeral 45 represents a holder mounted on the periphery of the liquid crystal lens 22 and 46 a gas/liquid feed pipe having, for instance, a feed pot in a control section, now shown, of the endoscope and a discharge port 46a in a tip portion thereof and constructed of transparent material, arranged so as to bend in the midway to adhere closely to front and rear surfaces of the liquid crystal lens 22 and cover them. Gas or a liquid of a predetermined temperature flows into the feed pipe 46, and the effect of ambient temperatures and the conduction of heat generated from the light guide 24 which relate to the liquid crystal lens 22 are interrupted so that the temperature of the liquid crystal lens 22 per se can be adjusted. Reference numeral 49 represents transparent windows provided on the outer surfaces of portions of the feed pipe 46 corresponding to the optical path and a coating for reducing surface tension is applied to the surfaces of the windows directed to the liquid crystal lens 22 so that droplets of water are prevented from adhering to the windows.

Because the fifteenth embodiment is designed as in the preceding description, a desired focal length can be secured if the liquid crystal lens 22 is driven by a liquid crystal driving means not shown to change its refractive index. At this time, even through there is any difference between the temperature of the liquid crystal lens 22 and the ambient temperature or the temperature of heat generated from the illuminating light, the conduction of the temperature to the liquid crystal lens 22 will be interrupted by virtue of a temperature-controlled liquid or gas supplied through the gas/liquid feed pipe 46 and the temperature of the liquid crystal lens 22 will be maintained in an appropriate range, with the result that the speed of change of the refractive index can be made stable. Further, by varying the temperature of the liquid or gas in the feed pipe 46, the speed of change of the refractive index in the liquid crystal lens 22 can also be controlled. Although the liquid of gas fed into the feed pipe 46 is discharged from the discharge port 46a, the discharge port 46a may be provided in the control section to discharge the liquid or gas therefrom and the discharged liquid or gas may be returned from feed port into the feed pipe 46 so as to be circulated.

Figure 23:
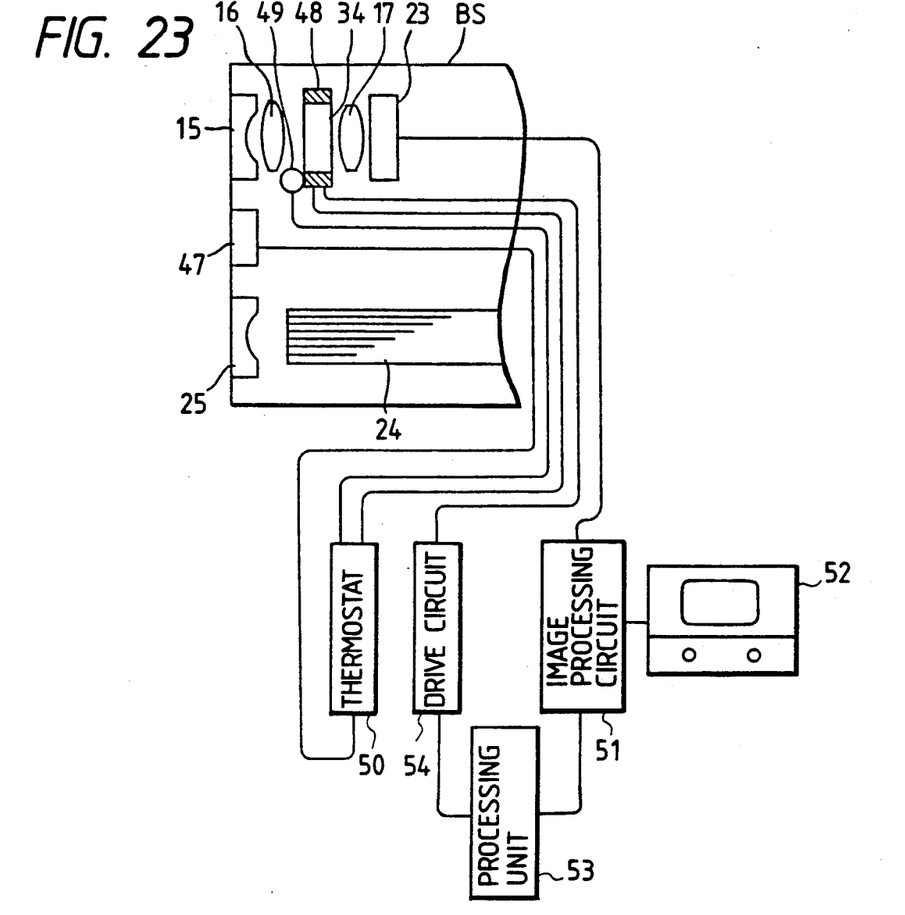

FIG. 23 shows a sixteenth embodiment, in which reference numeral 47 designates a thermal sensor arranged on the tip surface of the endoscope, for measuring the ambient temperature of the distal end portion BS of the endoscope, 48 a holder arranged on the periphery of the liquid crystal stop 34 to house a temperature control member such as a heater or a Peltier element, 49 a thermal sensor for liquid crystals attached to the holder 48 at a position out of the optical path, for measuring the temperature of the liquid crystal stop 34, and 50 a thermostat connected to the thermal sensors 47, 49 and the holder 48. This embodiment is such that a reference temperature of the liquid crystal stop 34 is set and when the ambient temperature is measured by the thermal sensor 47, the temperature control member in the holder 48 operates through an operation circuit not shown, the temperature of the liquid crystal stop 34 is made to fluctuate, and the temperature change of the liquid crystal stop 34 is previously adjusted on the basis of the difference with the ambient temperature and the temperature of the liquid crystal stop 34 is always maintained in the appropriate range in such a way that the temperature measured by the liquid crystal thermal sensor 49 is not deviated from the reference temperature. Reference numeral 51 designates an image processing circuit processing a signal outputted from the solid-state image pickup element 23, for displaying the object image onto a TV monitor, 53 a processing unit connected to the image processing circuit 51, and 54 a drive means connected between the liquid crystal stop 34 and the processing unit 53 and performing calculations through the processing unit to variably control the liquid crystal stop 34 so that the amount of light incident on the image pickup element 23 which is detected by the image processing circuit 51 reaches an extent suitable for image pickup and reproduction. Although the liquid crystal stop 34 is schematically shown, its concrete structure is the same as those explained in the above various embodiments.

Because the sixteenth embodiment is designed as stated above, an image signal received with the image pickup element 23 is processed by the image processing circuit 51 for display on the TV monitor 52 and the liquid crystal drive circuit 54 is operated in accordance with the amount of received light so that desired voltage and frequency are outputted and the liquid crystal stop 34 is driven to control the amount of light to be blocked. Since, at the same time, the temperature of the liquid crystal stop 34 is also controlled in a proper range by the temperature control member in the holder 48, in spite of the ambient temperature and the heating temperature of the light guide 24, a stable light-blocking speed is obtained. Also, variably controlling the reference temperature of the thermostat makes it possible to adjust the temperature of the liquid crystal stop 34 and control the light-blocking speed.

The holder 48, thermal sensors 47, 49 and thermostat 50 constitute the temperature control means.

Figure 24:
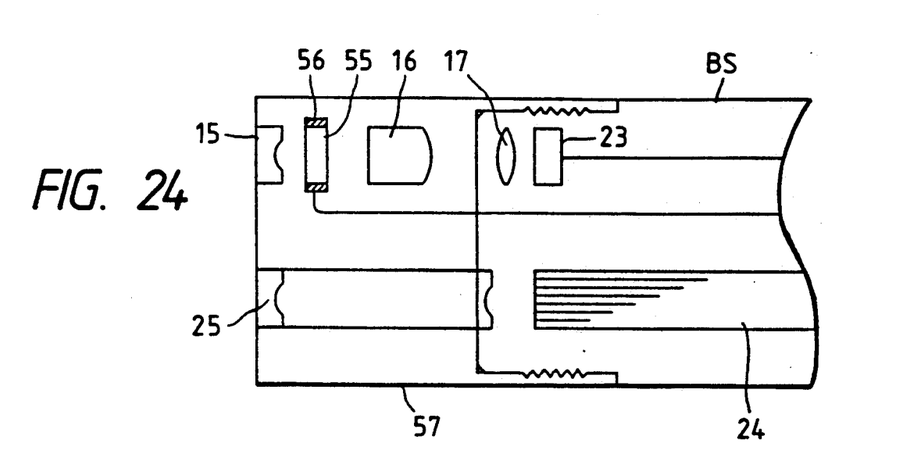

FIG. 24 shows a seventeenth embodiment. In this figure, reference numeral 55 represents a liquid crystal stop having the same structure as the liquid crystal stop 34 and connected to a drive circuit for liquid crystal not shown, 56 an adiabatic holder, similar to those mentioned already, provided on the periphery of the liquid crystal stop 55, and 57 a cap body including the liquid crystal stop 55, lenses 15 and 16, illuminating lens 25, etc. The cap body 57 is constructed to be removably coupled to the distal end portion BS of the endoscope so that, when it is coupled, respective optical axes of the image pickup optical system and illuminating optical system in the cap body 57 coincide with those in the endoscope body and electric lead wires relating to the liquid crystal stop 55 can also be connected to each other. Accordingly, a plurality of cap bodies 57 are prepared, the liquid crystal stops 55 constructed of liquid crystal materials with different drive temperature ranges are provided, and the cap body 57 provided with a proper liquid crystal stop 55 is selected and mounted to the distal end portion BS, thereby being able to adjust the light-blocking speed of the liquid crystal stop 55, together with the adiabatic holder 56.

Although the solid-state image pickup element 23 is used as an image transmitting means in each of the fifteenth to seventeenth embodiments, the image guide 19 and other light receiving elements may be adopted alternatively.

What is claimed is:

1. An optical apparatus including:
   a liquid crystal device,
   an imaging optical system for forming an image of an object, and
   an illuminating optical system irradiating the object, with illuminating light,
   wherein said liquid crystal device comprises a liquid crystal cell housing a liquid crystal and polarizers disposed on an entrance side and an exit side of said liquid crystal cell,
   the polarizer on the entrance side being disposed so that a plane of vibration of light transmitted through said polarizer on the entrance side is substantially normal to a plane of vibration of a P polarized light component of light emitted from said illuminating optical system and regularly reflected from the object to be incident on said imaging optical system.

2. An optical apparatus including:
   a liquid crystal device;
   an imaging optical system for forming an image of an object, and
   an illuminating optical system irradiating the object with illuminating light,
   wherein said liquid crystal device comprises a liquid crystal cell housing a liquid crystal and polarizers disposed on an entrance side and an exit side of said liquid crystal cell,
   the polarizer on the entrance side being disposed so that a plane of vibration of light transmitted through said polarizer on the entrance side makes substantially an angle of 45° with a plane of vibration of a P polarized light component of light emitted from said illuminating optical system and regularly reflected from the object to be incident on said imaging optical system.

3. An optical apparatus including:
   a liquid crystal device comprising a liquid crystal cell housing a liquid crystal and polarizers disposed on an entrance side and an exit side of said liquid crystal cell, and
   an optical element having polarizing characteristics for receiving two polarized light components normal to one another and then one of reflecting or transmitting the component having a greater intensity, a polarizer on the entrance side being disposed so hat a plane of vibration of light transmitted through said polarizer on the entrance side is substantially normal to a plane of vibration of a light subjected top one of transmission and reflection by said optical element.

4. An optical system according to claim 3, wherein said optical element having polarizing characteristics is a reflecting surface provided in said optical system and one of two polarized light components normal to each other at said reflecting surface has wave dependence of spectral reflectance larger than the other light component, said polarizer on the entrance side being disposed so that the plane of vibration of the light transmitted through said polarizer on the entrance side is substantially the same as a plane of vibration of a light component whose wave dependence of reflectance is smaller of said two polarized light components reflected from said reflecting surface.

5. An optical system according to claim 3, wherein said optical element having polarizing characteristics is a reflecting surface provided in said optical system and one of two polarized light components normal to each other at said reflecting surface has the spectral reflectance higher than the other light component, said polarizer on the entrance side being disposed so that the plane of vibration of the light transmitted through said polarizer on the entrance side makes substantially the angle of 45° with the plane of vibration of each of the polarized light components of said two polarized light components reflected from said reflecting surface.

6. An optical system according to claim 3, wherein said optical element having polarizing characteristics is a reflecting surface provided in said optical system and one of two polarized light components normal to each other at said reflecting surface has a spectral reflectance higher than the other light component, said polarizer on the entrance side being disposed so that the plane of vibration of the light transmitted through said polarizer on the entrance side makes substantially normal to a plane of vibration of light component whose reflectance is higher of said two polarized light components reflected from said reflecting surface.

7. An optical system including a liquid crystal device as a component, wherein said liquid crystal device comprises a liquid crystal cell housing a liquid crystal and polarizers disposed on an entrance side and an exit side of said liquid crystal cell, said liquid crystal cell being inclined with respect to an optical axis of said optical system, prisms for correcting aberrations being provided on an entrance side of a polarizer disposed on the entrance side and on an exit side of a polarizer disposed on the exit side.

8. An optical system including a liquid crystal device, as a component, wherein said liquid crystal device comprises a liquid crystal cell housing a liquid crystal and polarizers disposed on an entrance side and an exit side of said liquid crystal cell, said crystal cell being divided into plural sections to be symmetrical with respect to an optical axis of said optical system, directions of orientation of molecules of the liquid crystal varying for respective sections adjacent one another.

9. An optical system including a liquid crystal device, as a component, wherein said liquid crystal device comprises a liquid crystal cell housing a liquid crystal and polarizers disposed on an entrance side and an exit side of said liquid crystal cell, said liquid crystal device being rotationally symmetric around an optical axis of said optical system.

10. An optical system including a liquid crystal device, as a component, wherein said liquid crystal device comprises a liquid crystal cell housing a liquid crystal and polarizers disposed on an entrance side and an exit side of said liquid crystal cell, said liquid crystal cell being inclined with respect to an optical axis of said optical system, an angle of inclination of said liquid crystal cell being adjustable.

11. An optical system according to claim 8, wherein the directions of orientation of the molecules of the liquid crystal in said respective sections adjacent to one another assume rotational symmetry with respect to said optical axis.

12. An optical system according to claim 11, wherein each of said polarizers is divided into portions corresponding to said plural sections and a plane of vibration of light capable of being transmitted by said portions are determined in accordance with the directions of the molecule arrays of the liquid crystal in the sections of said liquid crystal cell.

* * * * *